US008880291B2

(12) United States Patent
Hampiholi

(10) Patent No.: US 8,880,291 B2
(45) Date of Patent: Nov. 4, 2014

(54) METHODS AND SYSTEMS FOR PREVENTING UNAUTHORIZED VEHICLE OPERATION USING FACE RECOGNITION

(75) Inventor: Vallabha Vasant Hampiholi, Bangalore (IN)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 13/473,955

(22) Filed: May 17, 2012

(65) Prior Publication Data

US 2013/0311001 A1   Nov. 21, 2013

(51) Int. Cl.
  *G05D 1/00*   (2006.01)
  *G05D 3/00*   (2006.01)
  *G06F 7/00*   (2006.01)
  *G06F 17/00*  (2006.01)

(52) U.S. Cl.
  USPC ............................. 701/36; 455/404.1; 701/1

(58) Field of Classification Search
  USPC ......... 701/1, 33.4, 22, 409, 102, 49, 36, 29.3, 701/5; 382/118, 104, 116, 103; 340/5.2, 340/426.31, 5.53, 426.28; 180/272
  See application file for complete search history.

(56) References Cited

U.S. PATENT DOCUMENTS

| | | | |
|---|---|---|---|
| 4,067,411 A * | 1/1978 | Conley et al. ................. | 180/169 |
| 5,880,679 A * | 3/1999 | Lenart et al. ................... | 340/5.6 |
| 6,252,978 B1 * | 6/2001 | Grantz ........................... | 382/118 |
| 6,400,835 B1 | 6/2002 | Lemelson et al. | |
| 6,831,993 B2 * | 12/2004 | Lemelson et al. ............ | 382/118 |
| 7,110,570 B1 * | 9/2006 | Berenz et al. ................. | 382/104 |
| 7,116,803 B2 * | 10/2006 | Lemelson et al. ............ | 382/118 |
| 7,259,659 B2 * | 8/2007 | Liu ........................... | 340/426.31 |
| 7,602,947 B1 * | 10/2009 | Lemelson et al. ............ | 382/116 |
| 7,760,070 B2 * | 7/2010 | Ohtaki et al. ................. | 340/5.53 |
| 7,817,013 B2 * | 10/2010 | Bazakos et al. ................ | 340/5.7 |
| 7,843,313 B2 * | 11/2010 | Bazakos et al. ................ | 340/5.7 |
| 8,344,849 B2 * | 1/2013 | Larsson et al. ................. | 340/5.2 |

(Continued)

FOREIGN PATENT DOCUMENTS

| EP | 1700761 A1 | 9/2006 |
|---|---|---|
| WO | 2007008159 A2 | 1/2007 |

OTHER PUBLICATIONS

Belhumeur, et al, "Eigenfaces vs. Fisherfaces: recognition using class specific linear projection", IEEE Transactions on Pattern Analysis and Machine Intelligence, vol. 19, No. 7, Jul. 1997; pp. 711-720.

(Continued)

*Primary Examiner* — Thomas G Black
*Assistant Examiner* — Robert Payne
(74) *Attorney, Agent, or Firm* — Dalpreet Saluja

(57) ABSTRACT

Various embodiments relate to systems and methods for detecting an unauthorized use of a vehicle. One or more facial images of one or more authorized drivers of a vehicle may be stored on a vehicle computing system. After detecting movement of the vehicle, one or more facial images of a driver of the vehicle may be periodically received from at least one in-vehicle camera. The one or more captured facial images of the driver may be periodically processed based on the stored facial images of the one or more authorized drivers to determine if the driver is an authorized driver. If the driver is not an authorized driver based on the periodic determination, vehicle operation may be disabled. If the driver is authorized based on the periodic determination, operation of the vehicle may continue.

23 Claims, 3 Drawing Sheets

(56) References Cited

U.S. PATENT DOCUMENTS

2002/0097145 A1* 7/2002 Tumey et al. .................. 340/426
2003/0142849 A1* 7/2003 Lemelson et al. ............. 382/104
2004/0234109 A1* 11/2004 Lemelson et al. ............. 382/118

OTHER PUBLICATIONS

Kirby, et al, "Application of the Karhunen-Loeve Procedure for the Characterization of Human Faces", IEEE Transactions on Pattern Analysis and Machine Intelligence, vol. 12, No. 1, Jan. 1990; pp. 103-108.

http://www.face-rec.org/algorithms/.
Choi, et al, "Color Face Recognition for Degraded Face Images", IEEE Transactions Systems, Man, and Cybernetics, Part B: Cybernetics, vol. 39, No. 5, Oct. 2009; pp. 1217-1230.
Mittal, et al, "Face Recognition Using Improved Fast PCA Algorithm", 2008 Congress on Image and Signal Processing, vol. 1, May 27-30, 2008; pp. 554-558.
Kwang, et al, "Face recognition using kernel principal component analysis", Signal Processing Letters, IEEE, vol. 9, No. 2, Feb. 2002; pp. 40-42.
Extended European Search Report—EP Application No. 13168066.2.

* cited by examiner

METHODS AND SYSTEMS FOR PREVENTING UNAUTHORIZED VEHICLE OPERATION USING FACE RECOGNITION

TECHNICAL FIELD

Various embodiments relate to a security system in a vehicle for preventing unauthorized vehicle use. In some embodiments, the security system may use face recognition for identifying one or more vehicle users and determining whether the vehicle user(s) is authorized to use the vehicle.

BACKGROUND

Unauthorized use of a vehicle is prevalent in every country. The unauthorized use may be, for example, a vehicle theft, a child taking a parent's car without permission, or a valet taking the vehicle for a "joy ride." Various proposals have been proffered to provide security measures in vehicles to prevent unauthorized use, or at least make it more difficult. Some of these proposals use a face recognition system which may be used to identify or verify a person from an image or video. For example, the face recognition system may extract unique features of the subject face from an image or video frame and use the information to identify the person. Examples of unique features of the face include size, shape of eyes, nose, mouth, cheekbones, jaws, and the like.

As one example, U.S. Pat. No. 6,400,835 to Lemelson et al. discloses a taillight mounted vehicle security system employing facial recognition using reflected image. A movable-vehicle security system includes a facial-recognition system including a scanner such as a television or infrared camera directed at the face of a person in the driver's seat. Output control signals are produced that are applied to enable or disable operation of the vehicle, with or without a key or other supplemental security system. The system includes a camera mounted on the "third taillight" assembly (which is mounted below the roof and inside the rear window), directed at the rear-view minor, and coupled to a facial-recognition computer, which in turn is coupled (with appropriate security precautions) to an enabling element for the vehicle, such as a starter motor. The system can be coupled to various elements of the motive system to create an auto-starting car. Other examples include U.S. Pat. Nos. 7,116,803 and 7,602,947 also to Lemelson et al.

Other types of security systems have also been proposed. For example, a vehicle security system may include a remote device that communicates with an alarm device mounted in the vehicle. The alarm devices may communicate with sensors which monitor, for example, the status of doors and movement in the vicinity of the vehicle. The remote device may be used to activate or de-activate the alarm. However, the alarm system does not verify the validity of the alarm trigger such as when the alarm is triggered when a passerby accidentally touches the vehicle or another vehicle moves too close to the vehicle.

SUMMARY

One aspect relates to a system for detecting an unauthorized use of a vehicle. The system may include a vehicle computing system. The vehicle computing system may be configured to store one or more facial images of one or more authorized drivers of a vehicle. The vehicle computing system may also be configured detect movement of the vehicle. After movement of the vehicle, one or more facial images of a vehicle driver may be periodically received from at least one in-vehicle camera. For example, the images may be received based on time and/or one or more trigger events. The one or more captured facial images of the driver may be periodically processed based on the stored facial images of the one or more authorized drivers to determine if the driver is an authorized driver. If the driver is not an authorized driver based on the periodic determination, vehicle operation may be disabled. If the driver is authorized based on the periodic determination, operation of the vehicle may continue.

In some embodiments, the vehicle computing system may be configured to determine if it is safe to disable the vehicle during vehicle movement when the driver is unauthorized.

In some embodiments, using a cellular communication device communicating with the vehicle computing system, the vehicle computing system may be further configured to transmit one or more messages to emergency responders when the driver is unauthorized.

In some embodiments, the vehicle computing system may be configured to send instructions to one or more in-vehicle cameras to scan an image field in order to detect a presence in the vehicle of at least one vehicle occupant other than the driver. A status of the at least one vehicle occupant as an authorized driver may be determined if detected based on the scan. Based on the status of the at least one detect vehicle occupant, a determination may be made whether the driver is an authorized driver.

Another aspect relates to a system for detecting an unauthorized use of a vehicle wherein the system may include one or more vehicle cameras which periodically capture one or more facial images of a driver of a vehicle after a vehicle startup and a vehicle computing system in communication with the one or more vehicle cameras. The vehicle computing system may be configured to periodically receive one or more facial images of the driver from the one or more vehicle cameras after detecting movement of the vehicle. The vehicle computing system may be further configured to periodically determine if the driver is an authorized driver based on the one or more received facial images of the driver. If the driver is not an authorized driver based on the periodic determination, vehicle operation may be disabled. If the driver is authorized based on the periodic determination, operation of the vehicle may continue.

In some embodiments, the vehicle computing system may be configured to receive messages from one or more vehicle sensors communicating with the vehicle computing system indicating the movement of the vehicle. One or more messages may be transmitted to the one or more vehicle cameras to activate the camera(s) in response to the movement of the vehicle.

The one or more vehicle cameras may be configured to receive one or more messages from one or more vehicle sensors communicating with the one or more cameras. The one or more message may define one or more triggering events for capturing the one or more facial images of the drive.

Another aspect relates to a computer-implemented method for detecting an unauthorized use of a vehicle. The method may include storing one or more facial images of one or more authorized drivers of a vehicle. During a journey of the vehicle, one or more facial images of a driver of the vehicle may be periodically received from at least one camera in the vehicle and one or more facial images of one or more vehicle passengers who is an authorized driver may also be periodically received.

The one or more captured facial images of the driver and the one or more passengers may be periodically processed based on the stored facial images of the one or more authorized drivers. A determination may be made if the driver is an authorized driver based on the processing of the one or more captured facial images of the driver and the one or more passengers. If the driver is not an authorized driver based on the periodic determination, vehicle operation may be disabled. If the driver is authorized based on the periodic determination, operation of the vehicle may continue.

In some embodiments, a determination may be made if the driver is authorized by identifying an association between the driver and the one or more passengers stored in an image database.

In some embodiments, profile information of the driver may be retrieved to identify the age of the driver to determine if the driver is an authorized driver based on the age of the driver.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In one or more embodiments, face recognition technology may be utilized to prevent unauthorized use of a vehicle, such as vehicle theft. The system may identify an authorized vehicle user based on learned recognition of the faces of all possible authorized drivers of a vehicle. In some embodiments, images of the face of the one or more authorized user may be stored in system memory and the images may be used to recognize the authorized vehicle user(s). In additional or alternative embodiments, a face recognition algorithm may be used to identify the driver. A driver's facial image may be captured by one or more on-board cameras and processed by the face recognition algorithm. Based on the processing of the image through the face recognition algorithm, the driver may or may not be given control of the vehicle.

In addition to vehicle startup (or key-on), the security system may perform the authorization process throughout the journey. For example, the system may perform the driver authorization at predetermined intervals and/or in response to one or more triggers during the driver's journey. Further details of the authorization system will be described below.

Figure 1:
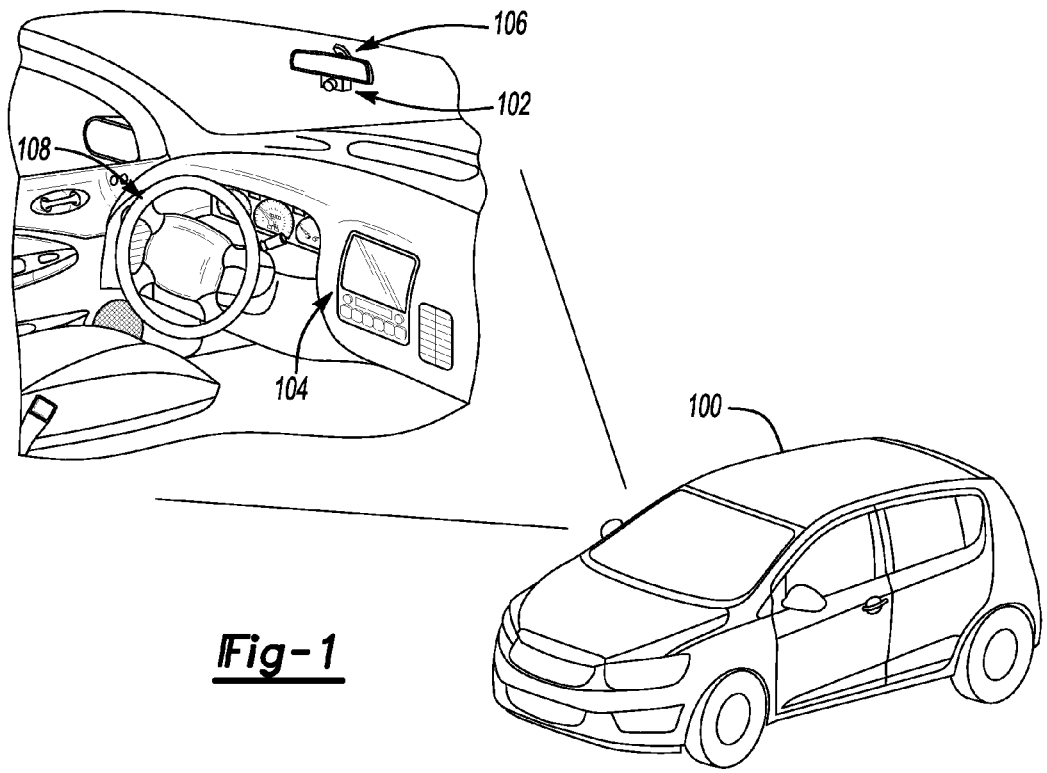
FIG. 1 illustrates at least one in-vehicle camera for face recognition and authorization of one or more vehicle users.

FIG. 1 shows an in-vehicle camera 102 used for face recognition of one or more vehicle occupants and determining if vehicle use is unauthorized. The vehicle occupants may include a driver or a driver and one or more vehicle passengers. One or more cameras 102 may be arranged anywhere in the cabin of the vehicle 100. In particular, the camera(s) may be arranged in the vehicle in a manner which enables it to capture facial images of the driver. In some embodiments, as described below, the camera(s) may also be arranged to capture facial images of vehicle passengers.

As shown in FIG. 1, the camera may be an attachment to or fixture of the vehicle cabin. The camera may be factory installed or an aftermarket device for the vehicle. Additionally or alternatively, the camera(s) 102 may be integrated with one or more vehicle fixtures. Non-limiting examples include the on-board computing unit (OBU) 104, the rear-view mirror 106, and/or the steering wheel 108. The camera may be, for example, a wide angle (e.g., fish eye) camera having high, medium, or low resolution. In some embodiments, the camera 102 may have at least 640×480 pixel resolution (at least 0.3 megapixels). Further, the camera(s) 102 may have an optional autofocus and an LED flash.

Figure 2:
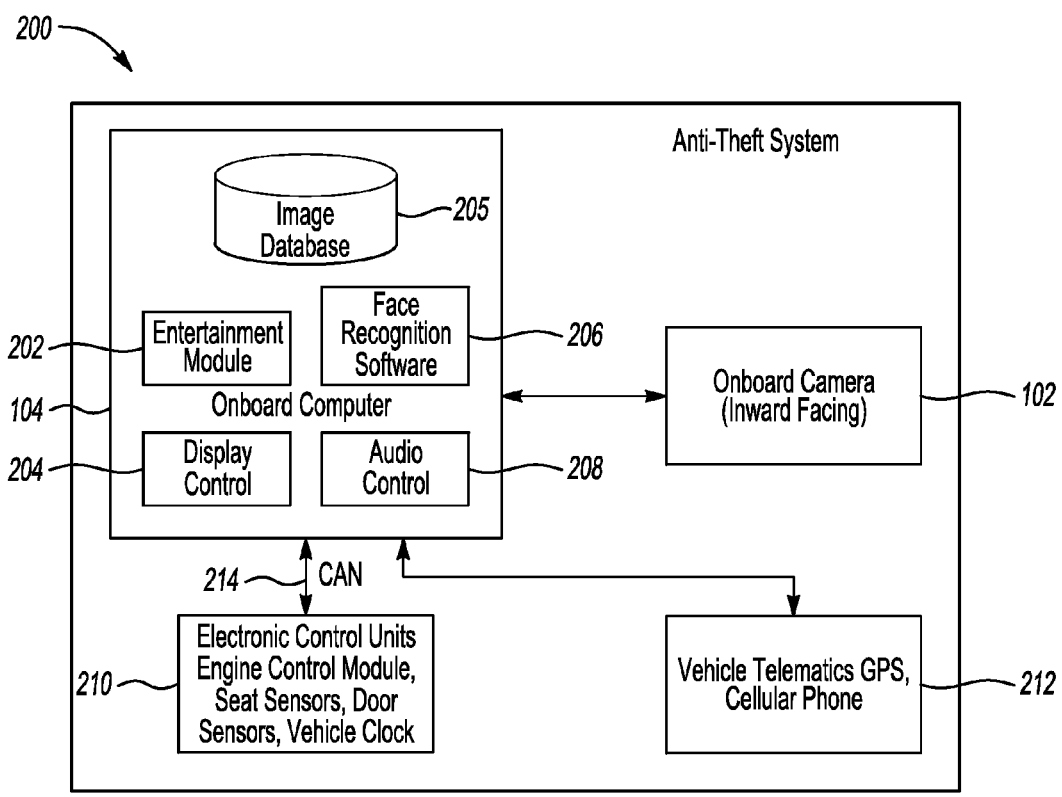
FIG. 2 illustrates a vehicle use authorization system.

The in-vehicle camera communicates with a vehicle use authorization system. FIG. 2 shows a vehicle use authorization system 200 according to one of its various embodiments. The vehicle user authorization system may operate and be operated entirely on-board (as shown in FIG. 2), perform functions on-board and off-board, or operate entirely off board. For purposes of simplicity, FIG. 2 is shown as an on-board system. Details of the various embodiments will be described below.

While a vehicle is moving, the cameras(s) 102 may periodically determine if a vehicle driver is unauthorized to use the vehicle by receiving and processing the facial images of the vehicle driver. As non-limiting examples, the periodic determination may be made every predefined number of seconds and/or minutes after vehicle startup. Additionally or alternatively, the periodic determination may be made based on one or more of the following non-limiting triggers shown in Table 1. The facial processing will occur (i.e., the face recognition will be triggered) multiple times throughout a journey in order to continuously confirm that unauthorized use of the vehicle is prevented.

TABLE 1

| Trigger | Non-limiting Examples and Description |
|---|---|
| Change in seat pressure after the vehicle has started or while in motion | A pressure change due to a heavier or lighter person sitting in the driver's seat; pressure change due to a driver leaving or entering the vehicle |
| Erratic acceleration | The driver is driving over a threshold speed limit. The speed limit may be obtained from route information and/or image processing of speed limit signs by a camera outside the vehicle. Hard or rapid acceleration after vehicle startup |
| Deviating away from regular routes | Route may be stored in memory of the OBU 104 based on user behavior or historical route information. |
| Detection of a border crossing | Border crossing information may be obtained from GPS/navigation and geolocation data. |
| Detection of a car yard on the present route | The car yard may be detected through GPS/navigation and geolocation data. |
| Doors opening and closing while the vehicle is keyed on | Door status messages may be received by the OBU 104 over the vehicle network from one or more vehicle sensors. |
| The vehicle is in a secure or protected area | A bank or a federal government building Determined from GPS and geolocation data |
| Gear shift | Gear is shifted from park into a driving gear |

The value of the seat load (e.g., weight or pressure) may be obtained from one or more sensors in the vehicle seat such as a load sensor communicating with the OBU 104. The seat load value associated with a vehicle driver may be stored in memory of the OBU 104 and associated with the driver's image. In some embodiments, the pressure value may be within a range to account for, for example, weight change of the vehicle driver. Of course, the system continues to periodically perform facial recognition to account for instances where the pressure value is the same as or within the range of the driver's.

The seat load may be obtained and stored for one or more users of the vehicle (e.g., a family of drivers or a driver and a passenger) at any time during vehicle ownership. As will be described below, using face recognition for multiple occupants in the vehicle may prevent unauthorized use of a vehicle, for example, when a minor is driving without a parent in the vehicle.

With respect to deviating from a regular route, the route deviation may also be from the currently input route. Accordingly, if a route deviation is detected from the calculated route, a facial recognition process may be performed.

In some embodiments, to detect erratic driving, one or more cameras on the vehicle exterior (e.g., a front view camera) may be used to recognize the speed limits. The image processing and recognition of speed limit signs may be performed using techniques known to one of ordinary skill in the art. Using the speed detected from the speed sign, if the speed of the vehicle is above the speed limit, the driver may be verified as an authorized user using face recognition.

Exterior camera(s) may additionally be used for lane tracking. Further details will be described below.

The camera(s) 102 may be powered through one or more batteries in the camera(s) 102 and/or through the vehicle battery. In some embodiments, there may be an additional battery in the vehicle to power the camera(s) 102. In some embodiments, the battery may be rechargeable. For example, if the vehicle is a hybrid vehicle, the camera battery may be charged when the vehicle is being charged. In some embodiments, to conserve battery, a vehicle user may define when to initiate facial recognition based on time and/or one or more of the triggers in Table 1.

The camera(s) 102 may be powered or woken up in response to a camera activation event. A non-limiting example of a camera activation event is motion of the vehicle as determined from one or more of steering wheel turns, one or more driving gears being activated, and movement of vehicle wheels. Detection may be made from one or more sensors in the vehicle through methods known to one of ordinary skill in the art.

After successful identification of a driver and, in some embodiments, one or more passengers, facial recognition may continue while on a journey to confirm that the driver is authenticated based on the time intervals and/or the trigger points described in Table 1. Continued monitoring of the driver may prevent car high jacking or other unauthorized use of the vehicle. In some embodiments, for additional security, the monitoring of unauthorized use of the vehicle after vehicle startup and during a journey, as described in the various embodiments, may be used in conjunction with a system for enabling or disabling vehicle startup such as those described in U.S. Pat. Nos. 6,400,835, 7,116,803 and 7,602,947 to Lemelson et al.

For power saving, the camera may be deactivated when the vehicle is powered off and/or while the vehicle is travelling unless the camera(s) 102 is triggered for face recognition based on the time lapse and/or one or more of the triggers in Table 1. Thus, the camera may be powered down or may be put in a sleep mode when face recognition is suspended.

If face recognition occurs only at vehicle startup, a savvy vehicle hijacker or at least one familiar with the vehicle, such as a dealer or vehicle service technician, may be able to disable the authorization process at vehicle startup. As a non-limiting example, a service technician may disable the vehicle startup authorization process in order to prevent the vehicle from being disabled and, thus, hampering vehicle servicing. Accordingly, face recognition occurs during a vehicle journey as well in order to ensure that unauthorized use of the vehicle is prevented. A savvy hijacker would be unable to disable authorization during a journey, or at least would be deterred from doing so, because the face recognition occurs at predefined time periods and/or in response to the one or more triggers during the journey. As will be described in further detail below, when an unauthorized user is detected to be driving the vehicle, one or more alerts may be sent to the vehicle owner and/or emergency responders. Attempting to disable the authorization process during a journey may hinder a successful getaway.

As another example, a car is typically left running when leaving the vehicle with a valet thereby bypassing the authorization process during startup. However, a valet may still use the vehicle without authorization. To prevent such unauthorized use, an authorization process during vehicle use may be performed.

Referring now to FIG. 2, a system topology of a system 200 that monitors unauthorized use of the vehicle 100 is shown. In-vehicle camera(s) 102 may communicate with an on-board computing unit (OBU) 104. The OBU 104 may include a processor (CPU) and memory. The memory may be volatile memory such as, and without limitation, random access memory (RAM). Additional or alternative memory may be non-volatile memory such as, and without limitation, a hard disk drive (HDD) or flash memory. At least some of the information stored in memory may be the image(s) of authorized users of the vehicle for use during the authorization process (as described below with respect to FIG. 3). In some embodiments, the image(s) may be stored in an image database 205 on the OBU 104.

An entertainment module 202 may control the entertainment in the vehicle 100. The entertainment module 202 may comprise media components such as a radio, CD/DVD player, satellite radio, and the like. The entertainment module 202 may be controlled via knobs, buttons, touchscreen inputs, and the like in the vehicle (e.g., in the centerstack).

The OBU 104 may be outfitted with a display and, in some embodiments, a touchscreen display. The display may be operated through one or more display controls 204, which may be graphical buttons on the display. In additional or alternative embodiments, the display control 204 may be physical buttons on or near the OBU 104 including, but not limited to, on the steering wheel, on the center stack, or on the center console of the vehicle. The physical buttons may be hard keys or soft keys. The OBU 104 may have software or firmware for receiving messages from, and transmitting messages to, the display control(s) 204 during operation of the display.

Audio in the vehicle 100 may be controlled through one or more audio controls 208. Audio may include, but is not limited to, an AM/FM radio, CD player, satellite radio, audio from a personal media player (e.g., an MP3 player), and the like. With respect to a control of audio from a personal media player (PMP), the communication between the PMP and the OBU 104 may be through a wired or wireless connection. The PMP and the OBU 104 may be embedded with a wireless transceiver (not shown) for enabling the wireless communication. As a non-limiting example of wireless communication, the PMP may be paired with the OBU 104 and data may be exchanged to and from the OBU 104 over the BLUETOOTH connection. As another example, the communication may be over an 802.11 communication standard such as WiFi or WiMax. The audio controls may be graphical buttons on the display or physical buttons (e.g., hard keys or soft keys) on or near the OBU 104. The OBU 104 may have software or firmware for receiving messages from, and transmitting messages to, the audio control(s) 208 during audio operation.

When the camera(s) 102 is awake, the camera(s) 102 may scan the image field in the vehicle to capture the face of the vehicle driver. The captured image(s) may be transmitted to the OBU 104. When facial images captured by the on-board camera 102 are received at the OBU 104, the image(s) may be processed by facial recognition software 206 executing on the OBU 104. The facial recognition software 206 may be programmed based on one or more algorithms for recognizing and authorizing the one or more users of the vehicle 100 during a journey. If the user is unauthorized based on the output of the algorithm(s), control signals for enabling vehicle control may be disabled (e.g., an authorized user may gain control of the vehicle). Alternatively, the control signal(s) may be transmitted for disabling vehicle control where the user is unauthorized. In either case, a user may not gain control of the vehicle if unauthorized.

In some embodiments, the facial recognition software 206 may be executing on the on-board camera 102. The output of the software 206 based on the algorithm(s) may be input to the OBU 104 from the camera(s) 102 for enabling or disabling use of the vehicle 100.

Face recognition algorithms may be geometric or photometric. Geometric algorithms use distinguishing features based on geometry for facial recognition. Photometric algorithms use statistical techniques that distill an image into values and then compare them with templates to eliminate variances. The algorithm(s) used for preventing unauthorized use of a vehicle may be based on the photometric approach for face recognition. The OBU 104 may identify and store unique properties of the face of each vehicle occupant. These may also be referred to as "eigenfaces." A combination of all the faces of the vehicle occupants may be the average eigenface. When a face is extracted from the image or video frames captured by the camera(s) 102 and stored on the OBU 104, the OBU 104 may perform a principal component analysis (PCA) and compare the output values with the stored eigenfaces of each authorized driver. The face recognition decision may be made based on how close the values of the face captured from the camera are to a standard set of coefficients stored in memory. It will be appreciated that these standard set of coefficients may be implementation specific.

The OBU 104 may be in communication, over a vehicle network 214, with one or more electronic control units (ECU) 210. Non-limiting examples of the one or more ECUs include the engine control module, seat sensors, door sensors, and a vehicle clock. In addition, the OBU 104 may be in communication, over the vehicle network 214, with one or more vehicle telematics devices 212. Non-limiting examples of the one or vehicle telematics devices 212 include GPS and an embedded cellular phone. The embedded cellular phone may communicate over 2G, 3G, 4G, or other similar communication standards. In some embodiments, the clock information may be received from a GPS module in the vehilce. The vehicle network may be, without limitation, CAN, GMLAN, MOST, or AVB (Audio-Video Bridging).

As will be described in further detail below, the messages sent from the one or more EDUs 210 and/or the telematics units 212 may be passed to the OBU 014 and further to the one or more camera(s) 102 for monitoring a passage of time and/or identifying one or more triggers for performing facial recognition. The messages may be exchanged over the vehicle network 214. In some embodiments, the messages may be directly exchanged between the ECU 210 and/or the telematics unit 212 and the one or more camera(s) 102.

Figure 3:
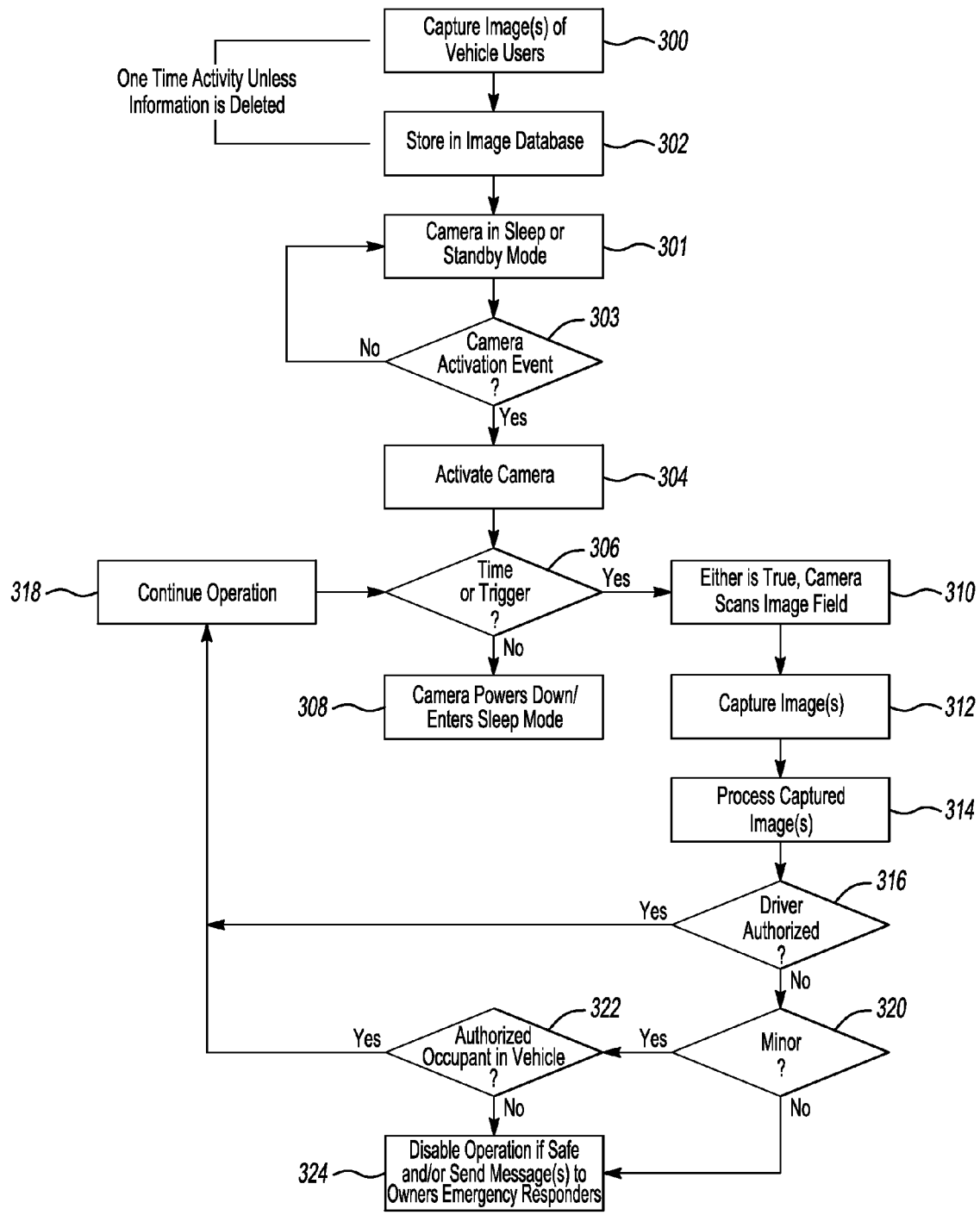
FIG. 3 illustrates a process for determining if a vehicle use is unauthorized.

FIG. 3 illustrates a process for detecting an unauthorized use of a vehicle using facial recognition. Initially, one or more images of authorized users may be stored in memory of the OBU 104 or, in some embodiments, the database 205. The image(s) may be stored for use during the authorization process in order to verify the driver or the driver and one or more vehicle passengers. To store the image(s), potential vehicle occupants may sit in the vehicle and input one or more commands to capture facial images. As a non-limiting example, the vehicle occupant may press one or more buttons in the vehicle. As another example, the vehicle occupant may speak one or more commands. In this example, the utterance may be received by one or more microphones in the vehicle (not shown) and one or more messages transmitted to the OBU 104 and/or the camera(s) 102 to capture the one or more image(s). Further instructions and notifications, such as a confirmation of the image capture, may be output from the display and/or one or more vehicle speakers (not shown). In some embodiments, multiple images of a vehicle occupant may be stored in order to improve the accuracy of the authorization process.

As a security feature, the OBU 104 one or more security keys (such as passwords) which may only be known to the authorized user(s) may be required to be input before storing the user images. The security key(s) may be input using touch-based inputs and/or speech-based inputs.

Referring to block 300, the image(s) of at least one authorized user may be captured. The number of vehicle users that may store facial image(s) may or may not be limited. The image(s) may be stored in memory or an image database 205 (block 302). Capturing the image(s) of authorized user for storing on the OBU 104 may be performed a single time unless the image(s) have been deleted.

To begin the authorization process, the OBU 104 may monitor for the camera activation event and send one or more messages to the camera(s) 102 if the event occurs. As described above, a camera activation event may be used to power on or awaken the camera(s) 102 for facial image processing. In alternative embodiments, the camera(s) may be woken, but put on standby, when the driver's door is opened for the purpose of monitoring for the camera activation event. If the camera activation event does not occur (block 303), the camera may remain in sleeping mode (block 301). If the event does occur (block 303), the camera may be activated (block 304).

After the camera activation event occurs, a determination may be made whether enough time has elapsed for facial image processing or one or more triggering events (e.g., one or more of the events in Table 1 above) for initiating facial image processing have occurred (block 306). If not, the camera(s) 102 may power down or sleep in order to conserve battery (block 308).

If a certain period of time has passed or one or more triggering events have occurred, the camera(s) may scan the image field for the faces of the driver or the driver and one or more passengers (block 310). The facial image(s) are captured by the camera(s) 312 and processed by the facial recognition software 206 based on the facial recognition algorithm(s) (block 314). The first image to be captured and processed may be the drivers and may be the only image needing processing. In some embodiments, however, as will be described in further detail below, if the driver is recognized as a minor, the camera(s) 102 may search, capture, and process images of other passengers in the vehicle in cases where the minor is required to be driving with an authorized driver (e.g., a parent).

In some embodiments, the camera(s) 102 may power down or sleep after a defined period of time of monitoring if the driver continues to be recognized during that time period and/or one or more of triggering events have not occurred during that time period. By way of example only, if 15 minutes have elapsed and/or no triggering event has occurred during the 15 minutes, the camera(s) 102 may sleep until a triggering event occurs.

After processing the driver's image, a determination may be made whether the driver is authorized (block 316). Except in cases where the driver is a minor, if the OBU 104 recognizes the driver as an authorized user, the driver may continue operating the vehicle (block 318). In some embodiments, a welcome message may be output (e.g., on the display or through the vehicle speakers) in the vehicle. During the journey, the camera may power on at specific time intervals and/or in response to the trigger events (block 306), some non-limiting examples of which are listed in Table 1, in order to capture the driver's image and present it to the OBU 104 for analysis via the facial recognition software 206.

If the driver is not recognized (block 316), the OBU 104 may perform a series of determinations before disabling further use of the vehicle. At least one determination may be determining if the driver is a minor (block 320). A minor may not be authorized to drive a vehicle unless a parent or other adult authorized to drive the vehicle is present. The minor's image(s) may be stored in the OBU 104 with an association to an authorized adult vehicle user whose image is also stored at the OBU 104. The association of the authorized adult user with the minor identifies the minor as an authorized user so long as the associated adult(s) is in the vehicle with the minor.

The OBU 104 may be configured to monitor the age of the minor to identify when the minor is a driving age. The vehicle owner may input at the OBU 104 and store in memory profile information of users of the vehicle including children who may be of driving age or close to driving age. The profile information may include a birthdate of each driver and the driver's license or permit information.

In some embodiments, the OBU 104 may be configured to verify a minor vehicle user's age to ensure that the vehicle user is of driving eligible age by calculating the earliest age that a driver is eligible to drive with respect to the present date. By way of example only, if the date of entry is Jan. 1, 2012, a minor would have to be born in 1997 or earlier to be eligible to drive. To further verify that a minor is eligible to drive, a verification may be made against license or permit information stored on the OBU 104. During input of the license information, verification may be made of the entered information by comparing the information to records of the minor driver, if available, obtained from a motor vehicle department and stored on the OBU 104. In some embodiments, the information may be input and stored on the OBU 104 by a vehicle dealer or an entity authorized by the motor vehicle department to input and store such information.

In some jurisdictions, a driver may obtain a provisional license before obtaining a driver's license with full driving privileges. In such jurisdictions, the system 200 may be configured to automatically stop monitoring for a parent when the minor obtains full driving privileges. For example, if the driving age is 16 in a particular jurisdiction, a notification may be sent to the parent when the minor turns 16 or thereafter asking whether monitoring should be turned off. The notification may be sent to the parents via a text-based notification such as SMS, text, MMS (i.e., a multimedia message containing the photo of the minor) or electronic mail. The monitoring may or may not continue depending on the response from the parent. If monitoring continues, the system 200 may continue to determine if an adult is in the vehicle with the driving minor as described above.

If it is determined that a minor is in the vehicle (block 320), a scan by the camera(s) 102 may be made for an authorized passenger (e.g., an adult occupant). If an additional occupant is in the vehicle who is also authorized (block 322), the minor driver may continue operating the vehicle (block 318). Otherwise, the minor driver is not authorized.

In all cases where a driver is not authorized, instructions may be sent from the OBU 104 over the vehicle network 214 to the ECU 210 to disable further operation of the vehicle (block 324) if safe to do so. Using GPS and lane tracking information (e.g., using the external camera and lane tracking methods known to one skilled in the art), the OBU 104 may determine if disabling further operation of the vehicle is unsafe or potentially fatal. If not, the vehicle may be brought to a halt and disabled from further operation (e.g., the vehicle is in a parking lot). As will be described below with respect to FIG. 4, a notification may be transmitted to the vehicle owner and/or emergency responders regarding the unauthorized use. If it is unsafe (e.g., the vehicle is travelling on a busy road such as a major street or highway), rather than bringing the vehicle to a halt, a notification may be sent to emergency responders along with GPS tracking information so the emergency responder can locate the vehicle. The OBU 104 may monitor when the vehicle stops at which point it may disable further operation of the vehicle.

Images captured through the onboard camera of the unauthorized user may be stored in the memory of the OBU 104. The stored images may be transmitted to the vehicle owner and/or emergency responders through one or more communication tools as will be described below.

Figure 4:
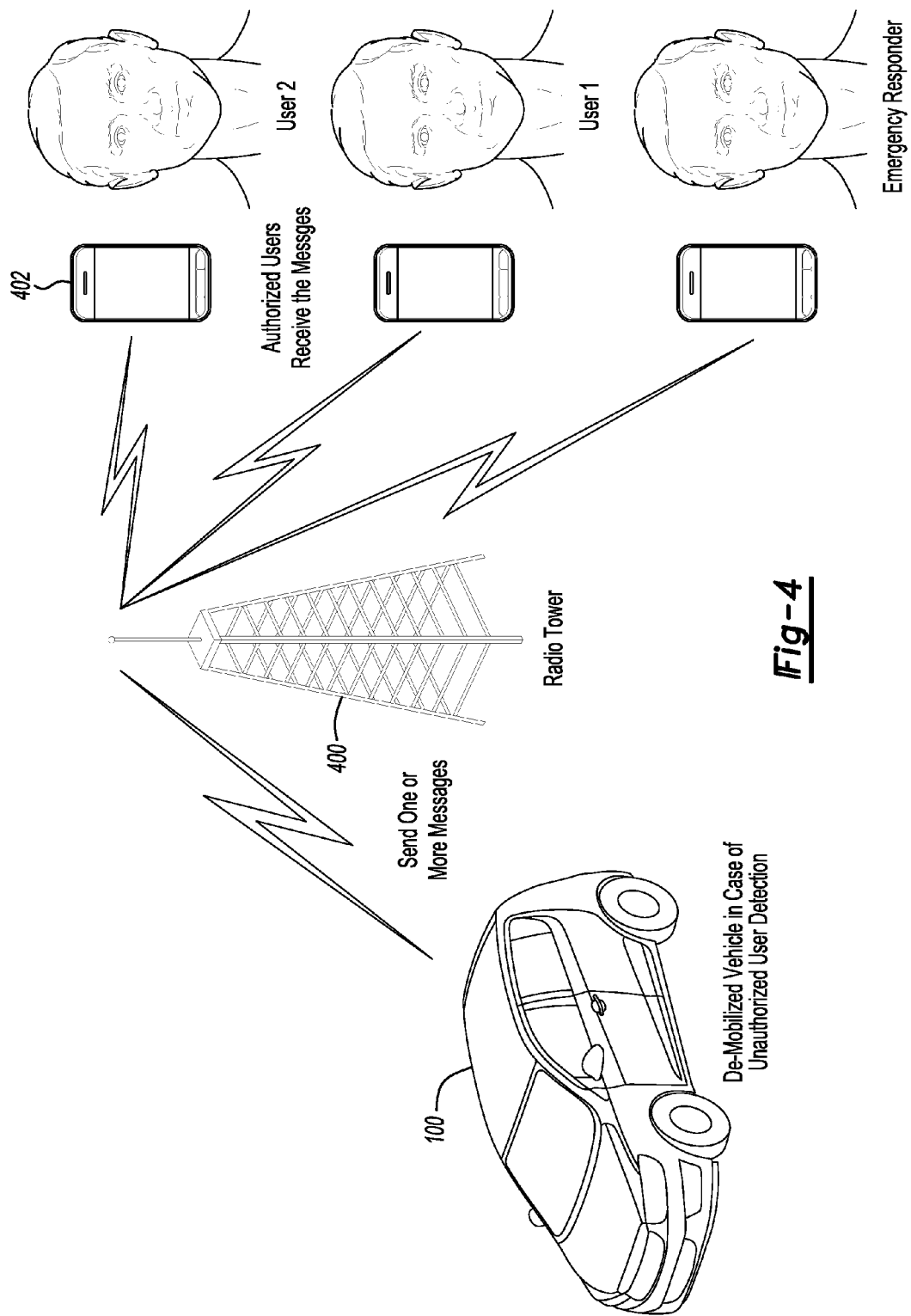
FIG. 4 illustrates a communication process between the vehicle and one or more authorized users and/or emergency responders for notifying an unauthorized use.

FIG. 4 illustrates a system and process for notifying a vehicle owner and/or emergency responders about an unauthorized use of a vehicle. When an unauthorized use is detected, one or more messages may be transmitted from the vehicle over cellular communication 400 to one or more remote user devices 402. The message(s) may be transmitted as SMS, text, or MMS messages. In some embodiments, the message(s) may be transmitted over the Internet such as through electronic mail. The user devices 402 may be, without limitation, a nomadic device (e.g., a mobile phone) or a personal computer. The message(s) may be transmitted as preformatted messages stored on the OBU 104.

The one or more messages may include vehicle tracking information including, but not limited to, GPS information. The emergency responders and/or vehicle owner can monitor the location of the vehicle. The vehicle owner can track the vehicle's location on a portable device, such as (and without limitation) a mobile phone, or on a computer. The vehicle owner may download an application to the portable device or computer which may include functionality for tracking a vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for detecting an unauthorized use of a vehicle, the system comprising:
   a cellular device communicating with a vehicle computing system; and
   a vehicle computing system configured to:
      store one or more facial images of one or more authorized drivers of a vehicle;
      detect movement of the vehicle;
      after movement of the vehicle, receive one or more facial images of a driver of the vehicle captured from at least one in-vehicle camera;
      process the one or more captured facial images of the driver based on the stored facial images of the one or more authorized drivers to determine if the driver is an authorized driver;
      if the driver is not an authorized driver based on the determination, disable continued vehicle operation and transmit over a communications network via the cellular communication device one or more messages of unauthorized use to one or more devices remote from the vehicle computing system; and
      if the driver is authorized based on the determination, enable continued operation of the vehicle.

2. The system of claim 1 wherein the period is time based.

3. The system of claim 1 wherein the one or more facial images are received based on one or more triggering events.

4. The system of claim 3 wherein the one or more triggering events include at least one of a change in seat pressure, erratic acceleration, deviating away from regular routes, detection of a border crossing, detection of a car yard on the present route, doors opening and closing while the vehicle is keyed on, the vehicle is in a secure or protected area, or a gear shift.

5. The system of claim 1 wherein the vehicle computing system is configured to determine whether it is safe to disable the vehicle during vehicle movement when the driver is unauthorized.

6. The system of claim 1 wherein the vehicle computing system is configured to transmit the one or more messages to emergency responders at the one or more remote devices via the cellular communication device when the driver is unauthorized.

7. The system of claim 6 wherein the one or more messages include vehicle tracking information.

8. The system of claim 1 wherein the vehicle computing system is on board the vehicle.

9. The system of claim 1 the vehicle computing system configured to process the captured facial images is further configured to:
   send instructions to one or more in-vehicle cameras to scan an image field to detect a presence in the vehicle of at least one vehicle occupant other than the driver;
   determine a status of the at least one other vehicle occupant as authorized to drive the vehicle if detected based on the scan; and
   determine if the driver is authorized or unauthorized based on the status of the at least one other vehicle occupant.

10. The system of claim 9 wherein the driver is a minor.

11. A system for detecting an unauthorized use of a vehicle, the system comprising:
   one or more vehicle sensors for detecting one or more non time-based triggering events to trigger a capture of one or more facial images of the driver after a vehicle startup
   one or more vehicle cameras which capture one or more facial images of a driver of a vehicle after a vehicle startup and in response to the one or more non time-based triggering events; and
   a vehicle computing system in communication with the one or more vehicle cameras and the one or more vehicle sensors configured to:
      detect movement of the vehicle;
      after movement of the vehicle, receive the one or more facial images of the driver from the one or more vehicle cameras upon detection of the one or more non time-based triggering events;
      determine if the driver is an authorized driver based on the one or more received facial images of the driver;
      disable continued vehicle operation if the driver is not an authorized driver based on the determination and transmit one or more messages of unauthorized use to one or more devices remote from the vehicle computing system; and
      enable continued operation of the vehicle if the driver is authorized based on the determination.

12. The system of claim 11 wherein the one or more vehicle cameras is in the vicinity of the vehicle cabin.

13. The system of claim 12 wherein the one or more vehicle cameras is on a head unit of the vehicle.

14. The system of claim 11 wherein the one or more non time-based trigger events occur while the vehicle is in motion.

15. The system of claim 14 wherein the one or more vehicle cameras are further configured to transmit the one or more facial images of the driver to the vehicle computing system.

16. The system of claim 11 wherein the one or more triggering events include at least one of a change in seat pressure, erratic acceleration, deviating away from regular routes, detection of a border crossing, detection of a car yard on the present route, doors opening and closing while the vehicle is keyed on, the vehicle is in a secure or protected area, or a gear shift.

17. The system of claim 11 further comprising a cellular communication device communicating with the vehicle computing system.

18. The system of claim 17 wherein the vehicle computing system is configured to transmit the one or more messages to one or more vehicle owners or one or more emergency responders at the one or more remote devices over the Internet via the cellular communication device when the driver is unauthorized.

19. A computer-implemented method for detecting an unauthorized use of a vehicle, the computer-implemented method comprising:
   storing one or more facial images of one or more authorized drivers of a vehicle;
   during a journey in the vehicle,
      receiving one or more facial images of a driver of the vehicle from at least one camera in the vehicle:,
      receiving one or more facial images of one or more vehicle passengers to determine if the one or more vehicle passengers have authorization to drive;
      processing the one or more facial images of the driver and the one or more passengers based on the stored facial images of the one or more authorized drivers;
      determining if the driver is an authorized driver based on the processing of the one or more captured facial images of the driver and the one or more passengers;
      if the driver is not an authorized driver based on the determination, disable vehicle operation; and
      if the driver is authorized based on the determination, enable continued operation of the vehicle.

20. The computer-implemented method of claim 19 further comprising determining whether it is safe to disable the vehicle during vehicle movement when the driver is unauthorized.

21. The computer-implemented method of claim 19 further comprising communicating with a cellular communication device to transmit one or more messages to one or more remote devices when the driver is unauthorized.

22. The computer-implemented method of claim 19 wherein determining if the driver is authorized includes identifying an association between the driver and the one or more passengers stored in an image database.

23. The computer-implemented method of claim 19 further comprising retrieving profile information of the driver to identify the age of the driver wherein the determining further includes determining if the driver is an authorized driver based on the age of the driver.

* * * * *